United States Patent [19]

van Raalte et al.

[11] Patent Number: 4,516,232
[45] Date of Patent: May 7, 1985

[54] VIDEO DISC PLAYER WITH COMPENSATION FOR STYLUS HOLDER MECHANICAL RESONANCE

[75] Inventors: John A. van Raalte; George H. N. Riddle, both of Princeton, N.J.

[73] Assignee: RCA Corporation, Princeton, N.J.

[21] Appl. No.: 382,199

[22] Filed: May 26, 1982

[51] Int. Cl.$^3$ ............................ G11B 9/06; H04N 5/76
[52] U.S. Cl. ..................................... 369/126; 358/340; 358/342; 369/90
[58] Field of Search .................. 369/126, 130, 47, 48, 369/49, 61, 62, 174, 175, 90, 91; 358/340, 167, 342, 336; 455/210; 381/13

[56] References Cited

U.S. PATENT DOCUMENTS

| | | | |
|---|---|---|---|
| 4,204,091 | 5/1980 | Ishigaki | 369/90 |
| 4,272,786 | 6/1981 | Gibson | 358/128.5 |
| 4,309,722 | 1/1982 | Palmer | 358/128.5 |
| 4,322,746 | 3/1982 | Oguino | 358/340 |
| 4,353,093 | 10/1982 | Durbin, Jr. et al. | 358/167 |
| 4,393,489 | 7/1983 | Mehrotra | 369/61 |

*Primary Examiner*—Raymond F. Cardillo, Jr.
*Attorney, Agent, or Firm*—E. M. Whitacre; P. J. Rasmussen; R. G. Coalter

[57] ABSTRACT

A video disc player includes a pick-up cartridge in which the stylus is supported by a stylus holder that is mechanically resonant at a frequency within an audio frequency range. A pick-up converter coupled to the stylus provides a broad audio video output signal that is undesirably modulated due to the stylus holder mechanical resonance. The audio signal is demodulated to baseband and linearly combined with the un-demodulated broadband signal to provide a resultant audio output signal in which audio frequency noise components, due to the mechanical resonance of the resulus holder, are attenuated.

9 Claims, 1 Drawing Figure

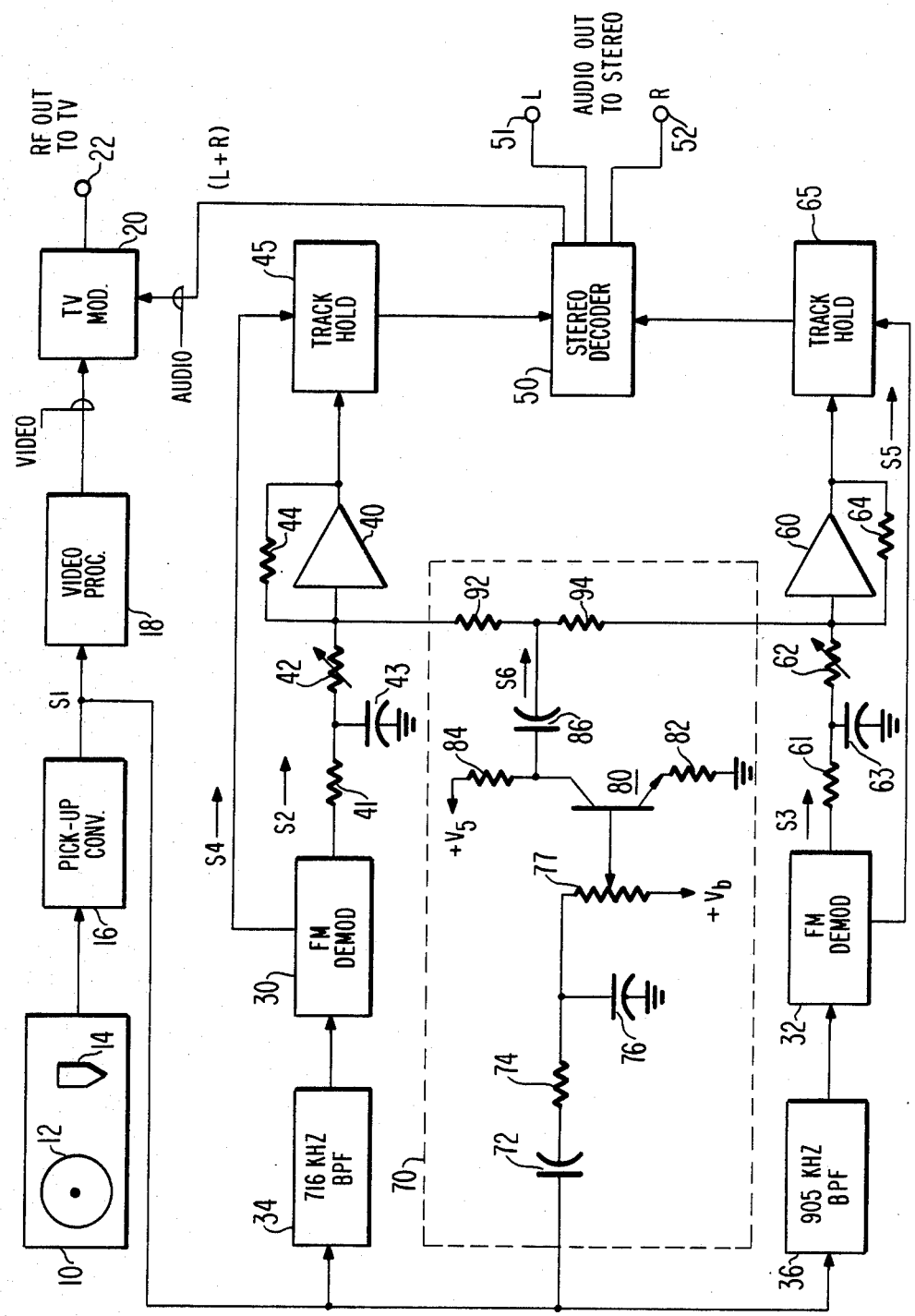

VIDEO DISC PLAYER WITH COMPENSATION FOR STYLUS HOLDER MECHANICAL RESONANCE

This invention relates to video disc players and particularly to players for use with disc records of the type in which information is stored in the form of topological variations and recovered by sensing capacitance variations between the record being played and a pick-up stylus.

In capacitive video disc players the recorded signal is recovered from the disc by a stylus tracking recorded information tracks on the surface of the disc. The stylus is secured to one end of a relatively long stylus arm, the other end of which is compliantly secured to a carriage mechanism. The carriage mechanism translates the stylus-stylus arm assembly radially across the disc at a speed in consonance with the radial movement associated with the stylus following the information track.

The stylus arm is arranged so that it is substantially tangent to the information track from which the recorded signal is currently being recovered. An "arm-stretcher" transducer is coupled to the end of the stylus arm and secured to the carriage for the purpose of creating longitudinal motion in the stylus arm. This motion is used to keep the relative stylus-disc velocity constant in a direction along the track being traced in order to compensate for time-base errors in the recovered signal. In addition, a further transducer (commonly referred to as a stylus "kicker") is coupled to the stylus arm for selectively producing lateral or side-to-side translations of the stylus to facilitate track location, escape from locked grooves, slow and fast motion effects, etc.

In order to facilitate incorporation of these features in the player, the stylus arm is relatively long and relatively rigid or stiff. However, in order for the pick-up stylus to track over vertical disc imperfections other than simple disc warp without being lofted from the disc, the stylus is secured to the stylus arm by means which provides a measure of vertical decoupling or compliance. Thus it has been found advantageous to mount the stylus in a resilient holder (e.g., plastic) which, in turn, is fixed to the stylus arm. Such holders have a longitudinal section generally colinear with the long axis of the stylus arm and yield vertically to permit the stylus to ride over bumps on the disc independently of the vertical inertia of the stylus arm itself. An example of such a stylus mounting arrangement is described in U.S. Pat. No. 4,030,124 entitled VIDEO DISC PLAYBACK SYSTEM AND PICKUP CARTRIDGE THEREFOR which issued to J. A. Allen, June 14, 1977 (incorporated herein by reference).

Pick-up cartridges of the aforementioned type are commercially available and provide very satisfactory performance in video disc players which supply a video and audio output signals to a television receiver for reproduction by the receiver sound system. The audio bandwidth of conventional television receivers, however, is relatively limited being on the order of a few kilo-Hertz or so. It has been found that when a relatively wide-band audio signal (e.g., 20-20,000 Hz) is reproduced from a disc record and monitored by a relatively high quality sound system (e.g., a stereophonic system separate from the television receiver), an erratic tone is present in the reproduced signal. The tone is located within the audio frequency band typically at a frequency of about 10 KHz and is manifested as a hissing sound. Because of its relatively high frequency within the audio band, the sound is not objectionable when monitored by a television receiver of limited bandwidth but has been found to be clearly audible when monitored on a high quality sound system. The tone or hissing noise is believed to be produced by mechanical resonance of the stylus holder of the pick-up cartridge which tends to modulate the amplitude and phase of the audio FM carrier recovered from the record being played. When the recovered audio FM carrier is demodulated to baseband, the modulation attributable to the mechanical resonance of the stylus holder appears in the demodulated baseband audio output signal of the player.

Attempts to stiffen the stylus holder so as to cause the resonant frequency to increase beyond the audio spectrum have not proved entirely satisfactory. In the co-pending commonly assigned U.S. patent application of S. T. Newell entitled DAMPING MECHANISM FOR A VIDEO DISC STYLUS HOLDER an arrangement is proposed which effectively absorbs a substantial portion of the mechanical energy at resonance and diminishes its effect on the recovered audio signal.

In addition to the aforementioned problem regarding stylus holder resonance effects, a further potential problem of video disc players of the capacitance electronic disc (hereinafter CED) type is that the FM audio carrier (or carriers for stereo player) may be undesirably influenced by surface irregularities of the disc being played. It has been found that some records exhibit a surface roughness having a characteristic which may be compared with the surface of an orange, hereinafter, the "orange peel effect". As in the stylus holder resonance effect, the orange peel effect causes undesirable vertical displacement of the player pick-up stylus and this, in turn, can result in undesirable amplitude and phase modulation of the recorded audio FM carrier. This effect is also manifested as noise in the demodulated audio output signal but at a generally lower frequency than the noise caused by the stylus holder resonance effect.

The present invention is directed to meeting the need for a video disc player in which undesired components (noise) of the player audio output signal induced by stylus holder resonance effects and/or by disc surface roughness effects are substantially reduced.

The present invention resides in part in recognition of two characteristics of the orange peel and resonance effects, namely: (1) correlation; and (2) consistency. Specifically, it has been found that the spectrum of the resonance or surface roughness induced demodulated audio component closely resembles and is correlated in phase and amplitude to a component found to exist in the broadband output signal recovered from the disc prior to demodulation and this effect is relatively consistent for different cartridges or discs.

A video disc player embodying the invention includes a pick-up cartridge having a capacitance sensing stylus. A pick-up converter means, coupled to the stylus, provides a broadband output signal inclusive of an audio FM carrier wave subject to phase modulation by vertical displacement of the stylus relative to the disc surface. The audio FM carrier wave is applied to a demodulator means which provides a demodulated audio output signal inclusive of a component representative of the vertical displacement of the stylus. Means are provided for combining the demodulated audio signal with the broadband output signal of the pick-up converter to provide a resultant audio output signal in which the vertical displacement induced component is attentuated.

The sole FIGURE is a block diagram, partially in schematic form, of a video disc player embodying the invention.

The player comprises a signal recovery unit 10 which includes a turntable for rotating a video disc record 12 and a pick-up cartridge 14 for recovering information from the record. The player is intended for use with records of the type in which information is stored in the form of topological variations and recovered by sensing capacitance variations between a stylus electrode in cartridge 14 and the record 12. Illustratively, it will be assumed that the stylus holder has a mechanical resonance within the audio frequency band which tends to cause amplitude and phase modulation of recovered audio and video FM signals.

The output of the pick-up stylus in cartridge 14 is applied to the input of a pick-up converter 16 which is responsive to the capacitance variations for providing a broadband output signal S1 having a video FM component and two audio FM components (for stereo records). Records of the capacitance storage type and suitable circuits for providing the capacitance-to-voltage conversion function of converter 16 are well known. See, for example, U.S. Pat. No. 3,783,196 HIGH DENSITY CAPACITIVE INFORMATION RECORDS AND PLAYBACK APPARATUS THEREFORE of T. O. Stanley. The broadband output signal S1 of pick-up converter 16 is applied to the input of a video processor 18 which includes a picture frequency bandpass filter, demodulator and conversion circuitry for providing a baseband video output signal of a standard television format such as NTSC or PAL. Such processors are well known, see for example, U.S. Pat. No. 4,247,866 of T. J. Christopher and J. A. Wilber which describes a suitable NTSC standard processor and U.S. Pat. No. 4,314,273 of J. G. Amery which describes a PAL standard processor.

The audio FM portion of the broadband signal S1 is processed, as will be explained, and applied along with the processed video signal to the inputs of a TV modulator 20 which supplies an RF output signal (inclusive of picture and sound components) to an RF output terminal 22 for connection to the antenna terminal of a conventional television receiver. An integrated circuit suitable for use as TV modulator 20 and which may be selectively operated to provide an output signal on selected TV channels (e.g., channels 3 or 4) is the model LM 1889N "TV Video Modulator" made by National Semiconductor Company, Inc.

Demodulated audio signals S2 and S3 are recovered from disc 12 by applying the output of pick-up converter 16 to a pair of FM demodulators 30 and 32 via respective bandpass filters 34 and 36. Preferably, the sound carrier center frequency choices correspond to odd multiples of half the horizontal line frequency as proposed in U.S. Pat. No. 3,969,756 of Palmer et al. Illustratively, for NTSC format players, filters 34 and 36 may have center frequencies of 716 KHz and 905 KHz, respectively, and bandwidths somewhat wider than the sound carrier peak deviation so as to ensure passage of first order and second order sideband components of the frequency modulated sound carriers.

Demodulators 30 and 32 also include defect detectors for producing respective defect indicating signals S4 and S5 in response to departures of a parameter (e.g., phase or amplitude) of the audio FM signals beyond normal limits. Suitable demodulators which provide such defect indicating signals are described, for example, in U.S. Pat. No. 4,203,134 of T. J. Christopher entitled FM SIGNAL DEMODULATOR WITH DEFECT DETECTION and U.S. Pat No. 4,038,686 of A. L. Baker entitled DEFECT DETECTION AND COMPENSATION.

The demodulated audio output signal S2 is coupled to the input of an inverting amplifier 40 via a series connection of resistors 41 and 42 the common connection of which is coupled to ground via a capacitor 43. Resistor 41 and capacitor 43 are selected to provide low pass filtering of signal S2 with a cut-off frequency of about 20 KHz. Amplifier 40 includes a feedback resistor 44 which provides negative feedback and, in combination with resistor 42 determines the closed loop gain of the amplifier. Either of resistors 42 or 44 may be variable for adjusting the gain in the audio signal S2 processing channel. For ease of adjustment of the overall audio processing system it is preferred that resistor 42 be varied (as shown).

The output of amplifier 40 is applied via a track/hold circuit 45 to one input of a stereo decoder 50. Circuit 45 is controlled by the defect indicating signal S4 and normally assumes a "tracking" mode when the defect indicating signal is absent. In the tracking mode, the output of amplifier 40 is coupled directly to the input of the stereo decoder. When the defect indicating signal is present, circuit 45 assumes a "holding" mode of operation to interrupt the signal to suppress disturbances such as "ticks" and "pops". The demodulated audio signal S3 is processed and applied to the other input of stereo decoder 50 in the same manner as signal S2 with elements 61–65 providing the corresponding functions as elements 41–45 as previously described. Stereo decoder 50 provides a sum output signal (L+R) to the TV modulator 20 and decoded left (L) and right channel (R) output signals to output terminals 51 and 52, respectively, for connection to the inputs of a stereophonic sound system. A preferred stereo decoder compatible with monophonic, matrixed stereophonic and unmatrixed bi-lingual audio signals is described in the U.S. patent application of G. N. Mehrotra, Ser. No. 248,776 filed Mar. 30, 1981, entitled VIDEO DISC PLAYER FOR MONOPHONIC, STEREOPHONIC AND BI-LINGUAL RECORDS.

The remaining elements of the video disc player comprise a stylus holder mechanical resonance compensator circuit 70 which provides the function of attenuating or "neutralizing" that portion of the demodulated audio output signals S2 and S3 attributable record surface roughness or to resonance of the stylus holder in pick-up cartridge 14. The compensator circuit comprises a D.C. blocking capacitor 72 for coupling the broadband output signal S1 produced by pick-up converter 16 to the input of a low pass filter comprising resistor 74 and shunt capacitor 76. The main purpose of the low pass filter is to provide a delay for the compensating signal (hereinafter signal S6) which is substantially equal to the delay in each of the audio signal processing channels. Since most of the delay in each channel is caused by the low pass filters at the demodulator outputs one may obtain a reasonably accurate delay match by simply selecting the time constant of resistor 74 and capacitor 76 to equal the time constant of the low pass filters at the demodulator outputs.

The output of the delay or low pass filter 74-76 is applied to an attenuator comprising a potentiometer 77 coupled to a source of base bias voltage Vb and having a wiper connected to the base of an NPN transistor 80. The emitter and collector electrodes of transistor 80 are coupled to ground and to a source of positive supply voltage (+Vs) via an emitter degeneration resistor 82 and a collector load resistor 84, respectively, thereby forming an inverting amplifier having a gain determined by the setting of potentiometer 77. The delayed and inverted compensating signal S6 produced at the collector of transistor 80 is coupled via a D.C. blocking capacitor 86 to a circuit node 90 which, in turn, is coupled to the inputs of amplifiers 40 and 60 via resistors 92 and 94, respectively.

In operation, when a record is being played the mechanical resonance of the stylus holder in pick-up cartridge 14 or surface roughness of the record causes amplitude and phase modulation of the audio FM signal components of the broadband output signal S1 produced by pickup converter 16. As a result, the demodulated audio output signals S2 and S3 each include a component representative of the undesired vertical displacement of the stylus. The broadband signal S1, however, has been found to also include an amplitude modulated component that is coherent with the surface roughness or stylus holder resonance induced component appearing in demodulated audio signals. The delay in the sound demodulation channels is matched by the delay introduced by resistor 74 and capacitor 76 in the compensating circuit 70. Since the compensating signal S6 is inverted prior to addition to the two audio signals S2 and S3 by amplifiers 40 and 60 it is possible to effectively cancel the resonance induced component in the audio output signals by appropriate adjustment of potentiometer 78. It will be appreciated, of course, that no inversion of the compensating signal S6 is necessary if demodulators 30 and 32 are of a type which provide inversion.

Various changes and modifications may be made to the video disc player within the spirit and scope of the present invention. In particular, the invention is not limited to the correction of audio problems caused by the aforementioned vertical stylus displacement effects. For example, where these displacements have an adverse effect on the quality of the processed video signal one may apply the compensating signal S6 to the video (luminance or chroma) processor to minimize the problem. In doing this, however, the delay required for the compensating signal is likely to be different for video compensation then that for audio compensation and an appropriate network should be selected to provide the desired delay for video compensation.

It will further be appreciated that although the compensating signal has been applied to the audio signals subsequent to low pass filtering of the demodulator output signals, it may instead be applied prior to the audio low pass filters with an appropriate reduction in delay compensation. Moreover, the compensating signal could be combined with the audio signals subsequent to amplification by amplifiers 40 and 60 is desired. It is desirable, however, that the compensation be applied prior to track/hold amplifiers 45 and 65 so that when audio defects are present the compensating signal is not passed to the player output terminals when the track/hold circuits are in the "hold" mode.

What is claimed is:

1. A video disc player for playback of video disc records of the capacitive information storage type, comprising:
    a capacitance sensing pick-up cartridge including a stylus supported by a stylus holder, said stylus holder being mechanically resonant at a frequency within an audio frequency range;
    pick-up converter means coupled to said stylus for providing a broadband output signal inclusive of an audio FM carrier wave subject to modulation by said mechanically resonant stylus holder;
    first means for demodulating the audio FM carrier wave to provide a baseband audio output signal inclusive of a noise component representative of the mechanical resonance of said stylus holder; and
    second means for linearly combining said baseband audio output signal of said first means with an undemodulated component of the broadband output signal produced by said pick-up converter means to provide a resultant audio output signal in which the mechanical resonance induced noise component is attenuated.

2. A video disc player as recited in claim 1 wherein said first means imparts a characteristic delay to the demodulated baseband audio output signal and wherein said second means includes means for imparting a substantially similar characteristic delay to the undemodulated component of the broadband output signal of the pick-up converter means.

3. A video disc player as recited in claim 1 wherein said player includes track/hold amplifier means coupled to an output of said second means for processing said resultant audio output signal.

4. A video disc player as recited in claim 1 wherein said second means comprises signal combining means having a first input coupled via a first circuit path to an output of said pickup converter means and having a second input coupled via a second circuit path to an input of said converter means, said second circuit path including delay means.

5. A video disc player as recited in claim 4 wherein said second path includes gain control means.

6. A video disc player as recited in claim 1 wherein said first means includes a cascade connection of a bandpass filter means, an FM demodulator means and a low pass filter means and wherein said second means includes signal summing means having a first input coupled to an output of said low pass filter means and having a second input coupled to an input of said bandpass filter means via a cascade connection, in any order, of a low pass filter means, an adjustable attenuator means and an amplifier means.

7. A video disc player for playback of monophonic, stereophonic or bi-lingual video disc records in which information is stored in the form of topological variations, said player comprising:
    a pick-up cartridge including a stylus held in stylus holder, said stylus holder having a mechanical resonance within an audio frequency band;
    pick-up converter means coupled to said stylus for providing a broadband output signal inclusive of a first audio FM carrier wave and a second audio FM carrier wave, each audio carrier wave being subject to modulation by the mechanical resonance of said stylus holder;
    first means for demodulating the first audio FM carrier wave to provide a first baseband audio output signal inclusive of a noise component representative of the mechanical resonance of said stylus holder;

second means for demodulating the second audio FM carrier wave to provide a second baseband audio output signal inclusive of said component representative of said mechanical resonance of said stylus holder; and third means for linearly combining the undemodulated broadband output signal produced by the pick-up converter means with the demodulated baseband output signals of the first and second means to provide first and second resultant audio output signals in which the mechanical resonance induced component in each resultant signal is substantially reduced.

8. A video disc player as recited in claim 7 wherein the third means exhibits a characteristic delay substantially equal to a delay characteristic of each of the first and second means.

9. A video disc player as recited in claim 7 further comprising defect compensating means for correcting defects in said first and second resultant audio output signals produced by said third means.

* * * * *